(12) United States Patent
Lynn et al.

(10) Patent No.: US 6,241,805 B1
(45) Date of Patent: Jun. 5, 2001

(54) METHOD AND SYSTEM FOR IMPROVING THE EFFICIENCY OF A BASIC OXYGEN FURNACE

(75) Inventors: John D. Lynn, Center Valley, PA (US); Colvin W. Smith, Catonsville, MD (US)

(73) Assignee: Bethlehem Steel Corporation, DE (US)

( * ) Notice: Subject to any disclaimer, the term of this patent is extended or adjusted under 35 U.S.C. 154(b) by 0 days.

(21) Appl. No.: 09/359,776

(22) Filed: Jul. 26, 1999

(51) Int. Cl.[7] .................................................. C21C 5/30
(52) U.S. Cl. ................................ 75/531; 75/751; 266/99
(58) Field of Search ............................ 75/531, 751, 746, 75/770; 266/99

(56) References Cited

U.S. PATENT DOCUMENTS

| | | |
|---|---|---|
| Re. 30,060 | 7/1979 | Kreiger ........................................ 75/3 |
| 2,710,796 | 6/1955 | Pinkerton .................................. 75/25 |
| 4,091,545 | 5/1978 | Izawa et al. ................................ 34/9 |
| 4,133,756 | 1/1979 | Arai et al. ............................... 210/67 |
| 4,711,662 | 12/1987 | Harada ................................... 75/1 R |
| 4,725,307 | 2/1988 | Harada ................................. 75/10.29 |
| 4,897,201 | 1/1990 | Yamamoto et al. .................. 210/729 |
| 5,004,496 * | 4/1991 | Aune et al. ........................... 75/10.28 |
| 5,114,474 | 5/1992 | Wilhelm et al. ......................... 75/751 |
| 5,355,594 | 10/1994 | Hwang .................................... 34/356 |
| 5,601,631 | 2/1997 | Rinker et al. ............................ 75/484 |
| 5,785,737 | 7/1998 | Lynn et al. ............................... 75/751 |
| 5,853,453 * | 12/1998 | Lehner et al. ........................... 75/531 |
| 5,885,328 * | 3/1999 | Markarian et al. ...................... 75/770 |

FOREIGN PATENT DOCUMENTS

| | | |
|---|---|---|
| 59-153848 | 1/1984 | (JP) . |
| 9207964 | 5/1992 | (WO) . |

* cited by examiner

*Primary Examiner*—Scott Kastler (57) ABSTRACT

A method is provided for improving the efficiency of a basic oxygen furnace operation and/or regulating its rate of molten iron consumption to accommodate interruptions in downstream production. The method comprises the steps of combining a wet scrubber sludge with hot slag to provide a slag/sludge mixture, commencing a steelmaking operation of the basic oxygen furnace (BOF), and introducing the slag/sludge mixture into the BOF during the steelmaking operation so that the BOF produces a desired quantity and quality of steel in a manner that is more efficient than without the slag/sludge mixture. Also provided is a system for improving the efficiency of a BOF operation. The system comprises a mixer and an introduction mechanism. The mixer is connected to a source of wet scrubber sludge and a source of hot slag. The mixer is adapted to combine the wet scrubber sludge with the hot slag to provide a slag/sludge mixture. The introduction mechanism is adapted to transport the slag/sludge mixture from the mixer to a BOF and is adapted to introduce the slag/sludge mixture into the BOF during a steelmaking operation of the BOF. The mixer and introduction mechanism are operable in conjunction with the BOF so that the BOF produces a desired quantity and quality of steel in a manner that is more efficient than without the slag/sludge mixture. Improvements in efficiency include reduced heat cycle times, reduced oxygen blow times, reduced demand for raw materials outside of the slag/sludge mixture, reduced disposal and transportation costs, and increased productivity.

37 Claims, 2 Drawing Sheets

METHOD AND SYSTEM FOR IMPROVING THE EFFICIENCY OF A BASIC OXYGEN FURNACE

BACKGROUND OF THE INVENTION

The present invention relates to a method for improving the efficiency of a basic oxygen furnace (BOF) during steelmaking operations, and more particularly, to a method capable of effecting a reduction in the heat time of a BOF, capable of providing a reduction in the oxygen requirements and/or other raw material requirements of each heat cycle in the BOF, and/or capable of providing at least one of these advantageous reductions using materials recycled from previous BOF operations. The present invention also relates to a method for accommodating production interruptions downstream of the BOF with minimal, if any, adjustment to the rate of molten iron production at a blast furnace upstream of the BOF, by using material recycled from previous operations of the BOF to selectively increase the molten iron-to-scrap ratio demanded by the BOF.

The steelmaking industry is very competitive. Significant efforts in the steelmaking industry have been directed to increasing productivity and reducing manufacturing costs, without detrimentally affecting the quality of the steel product. Recently, consumers of steel have increased their quality requirements and have imposed stringent criteria on what they will consider to be acceptable characteristics of a steel product. The higher standards, in turn, have placed significant restrictions on productivity, and in many cases, have resulted in a need for larger quantities of raw materials. The price of the steel, however, has not kept pace with the additional requirements. Heretofore, it has been difficult to satisfy higher quality standards in a manner that does not negatively impact productivity, that does not increase operating costs (e.g., raw material costs, energy costs, labor costs, and the like), and/or that does not require capital intensive changes to the BOF or its operation.

Environmental concerns have placed additional pressure on the steelmaking industry. Recent restrictions on the handling and disposal of steelmaking byproducts (e.g., the slag and sludge produced as a result of conventional steelmaking operations) have made transportation and disposal a very expensive endeavor. This, in turn, increases the overall cost of making steel. In addition, there is slight risk of spilling whenever such materials are transported. The disposal of steelmaking byproducts also consumes landfill space, which is undesirable in view of recent efforts to reduce the rate at which landfill space is consumed.

There is consequently a need for a process of recycling the steelmaking byproducts, rather than disposing of the byproducts. Because of the other pressures faced by the steelmaking industry, there is a need for such recycling processes to have little, if any, negative impact on productivity and/or the costs associated with the steelmaking operations.

Commonly owned U.S. Pat. No. 5,785,737 discloses a method for recycling iron-bearing sludges in a steelmaking operation. Incorporated herein by reference is the subject matter disclosed in U.S. Pat. No. 5,785,737 (hereinafter the '737 patent). As disclosed in the '737 patent, wet BOF scrubber sludge (which typically has a moisture content of about 30%) can be dehydrated to produce a steelmaking revert having an improved flow rate when handled in a recycle stream. In particular, the wet sludge can be combined with hot BOF slag to provide a slag/sludge mixture. The wet sludge preferably causes the mixture to have a moisture content greater than 10% water by weight, and the hot slag, having a temperature below the molten liquid state, vaporizes the water in the mixture and reduces the moisture content to about 4% water by weight or less. The dehydrated mixture then can be recycled as a steel making revert.

Similarly, commonly owned and co-pending U.S. patent appln. Ser. No. 09/070,661, filed on Apr. 30, 1998, discloses a method for recycling iron-bearing waste material back into a BOF. Incorporated herein by reference is the subject matter disclosed in U.S. patent appln. Ser. No. 09/070,661 (hereinafter the '661 application).

Because of the foregoing problems faced by the steelmaking industry, there is a need for a method of improving the efficiency of a basic oxygen furnace (BOF) during steelmaking operations. This need extends to a method capable of effecting a reduction in the heat time of a BOF, capable of providing a reduction in the oxygen requirement and/or other raw material requirements of each heat cycle in the BOF, and/or capable of providing at least one of these reductions using materials that are recycled from previous BOF operations.

Another problem faced by the steel industry arises because of the differences between how a blast furnace operates and how a BOF operates. A blast furnace typically is most efficient when it operates continuously. A certain rate of material introduction and molten iron production is optimal. At large scale steel manufacturing facilities, it may take as much as eight hours or more for changes in blast furnace charge to have any appreciable effect on the molten iron output from the bottom of the blast furnace.

Steel production at the BOF, by contrast, is performed in batches. If there are any interruptions in the production of steel at the BOF or downstream of the BOF, a back log of molten iron from the blast furnace begins to accumulate. Environmental concerns typically make dumping of the molten iron undesirable. The molten iron, however, will begin to solidify if the interruption lasts a long time. While a reduction in the blast furnace's output seems to be a logical solution to this problem, it is seldom practical to change the blast furnace's charge material or other operating parameters to slow production and thereby compensate for the interruption. The impracticality of such an approach is evident from the delay between the adjustments and their effect on the blast furnace's output. Additional disadvantages of this approach are the inefficiencies associated with taking the blast furnace out of its optimum operating conditions.

Thus, when there is an interruption downstream of the BOF, it would be desirable to increase the BOF's demand for molten iron and decrease its reliance on scrap. This way, the back log of molten iron could be minimized, if not avoided.

There is consequently a need in the art for a method of accommodating production interruptions downstream of the BOF with minimal, if any, adjustment to the rate of molten iron production at a blast furnace upstream of the BOF. In this regard, there also is a need for a way of selectively increasing the molten-iron-to-scrap ratio demanded by the BOF. Because of the desirability of recycling steelmaking byproducts, this need extends to a method of accommodating interruptions in downstream production using material recycled from previous operations of the BOF.

SUMMARY OF THE INVENTION

It is a primary object of the present invention to resolve at least one of the foregoing problems and/or satisfy at least one of the foregoing needs by providing a method and system for improving the efficiency of a BOF operation.

To achieve this and other objects, the method comprises the steps of combining a wet scrubber sludge with hot slag to provide a slag/sludge mixture, commencing a steelmaking operation of the BOF, and introducing the slag/sludge mixture into the BOF during the steelmaking operation of the BOF so that the BOF produces a desired quantity and quality of steel in a manner that is more efficient than without the slag/sludge mixture.

The present invention also provides a system for improving the efficiency of a BOF operation. The system comprises a mixer and an introduction mechanism. The mixer is connected to a source of wet scrubber sludge and a source of hot slag. The mixer is adapted to combine the wet scrubber sludge with the hot slag to provide a slag/sludge mixture. The introduction mechanism is adapted to transport the slag/sludge mixture from the mixer to a BOF and is adapted to introduce the slag/sludge mixture into the BOF during a steelmaking operation of the BOF. The mixer and introduction mechanism are operable in conjunction with the BOF so that the BOF produces a desired quantity and quality of steel in a manner that is more efficient than without the slag/sludge mixture.

Also provided by the present invention is a control system for improving BOF efficiency. The control system is suitably configured to perform the steps of receiving product information about a desired steel product, receiving ingredient information about ingredients of a slag/sludge mixture, and determining, based on the product information and ingredient information, operating parameters of a BOF. The operating parameters include amounts of ingredients required to achieve the desired steel product. The control system is further configured to determine a portion of at least one ingredient to be supplied from a slag/sludge mixture so that at least one of the following efficiencies occurs:

reducing a demand by said BOF for ingredients from other sources;

reducing an oxygen blow time; and reducing an overall time required by a heat cycle of the BOF.

The present invention also provides a method for accommodating production interruptions downstream of a basic oxygen furnace, with minimal, if any, adjustment to the rate of molten iron demand from a blast furnace upstream of the basic oxygen furnace. The method comprises the steps of: combining a wet scrubber sludge with hot slag to provide a slag/sludge mixture, commencing a steelmaking operation of the basic oxygen furnace, and introducing the slag/sludge mixture into the basic oxygen furnace during the steelmaking operation of the basic oxygen furnace so that the basic oxygen furnace produces the same quantity and quality of steel using a higher molten-iron-to-scrap ratio than without the slag/sludge mixture.

The above and other objects and advantages will become more readily apparent when reference is made to the following description taken in conjunction with the accompanying drawings.

DESCRIPTION OF PREFERRED EMBODIMENTS

According to a preferred implementation of the present invention, a method is provided for improving the efficiency of a BOF operation. The preferred implementation comprises the steps of combining a wet scrubber sludge with hot slag to provide a slag/sludge mixture, commencing a steelmaking operation of the BOF, and introducing the slag/sludge mixture into the BOF during the steelmaking operation so that the BOF produces a desired quantity and quality of steel in a manner that is more efficient than without the slag/sludge mixture.

Preferably, the step of combining the wet scrubber sludge with the hot slag is performed in one of the ways described in the '737 patent and/or the '661 application. Other ways of combining the wet scrubber sludge and the slag, of course, can be utilized. Generally, the technique used in each application of the method will depend to some extent on the desired quality of steel and on other factors that will become readily apparent to those of ordinary skill in the art upon reviewing the present disclosure.

The slag/sludge mixture advantageously can be derived from the same or a different BOF. The hot slag from a previous heat cycle of the same BOF, for example, can be used. Preferably, the hot slag has a temperature below the molten state to avoid excessively violent reactions with moisture in the sludge when the wet scrubber sludge is combined with the hot slag. During the step of combining the wet scrubber sludge with the hot slag, the heat from the hot slag serves to dehydrate the resulting slag/sludge mixture. As a result, it is typically not necessary to apply heat or other excessively expensive dehydration techniques to the mixture in order to provide a level of moisture within the tolerance range of the BOF.

Typically, the BOF revert does not exhibit acceptable handling characteristics when it has a moisture content greater than 10%. Thus, the slag/sludge mixture preferably is allowed to cure until the heat from the slag brings the moisture level below 10%. At moisture levels below 3%, however, such reverts tend to powder, and are difficult to handle. The powdery reverts also tend to be expelled from the BOF and overload the wet scrubber operations. It therefore is desirable to provide the slag/sludge mixture with a moisture level within the range of 3 percent and 4 percent before it is introduced into the BOF. Assuming an exemplary slag-to-sludge ratio of about 1:1, the 3–4% moisture level can be achieved by allowing the slag/sludge mixture to cure for about 16 hours. Other ways of achieving the desired moisture level, however, can be used. The advantage of using the heat from the hot slag is that no significant capital expenditures are required, nor does the use of such heat require additional power consumption.

The level of moisture in the slag/sludge mixture can be adjusted by making corresponding adjustments in the cure time, the slag-to-sludge ratio, and the like. Preferably, the slag/sludge mixture is combined at a slag-to-sludge ratio no greater than about 10:1, more preferably, at a ratio between 0.1:1 and 10:1.

Preferably, the step of introducing the slag/sludge mixture into the BOF is performed so that ingredients of the slag/sludge mixture react inside the BOF to reduce a demand by the BOF for such ingredients. Such ingredients can include, for example, oxygen, iron, and/or manganese. The oxygen can be provided by certain iron-based compositions in the slag/sludge mixture, such as FeO and $Fe_2O_3$. As will be described hereinafter, the step of combining the wet scrubber sludge with the hot slag can be performed so that the slag/sludge mixture includes beneficial amounts of manganese and the aforementioned iron-based compositions (i.e., FeO and $Fe_2O_3$). Preferably, the slag/sludge mixture is provided so that the iron-based compositions constitute at least half of the slag/sludge mixture and/or so that the manganese is present in an amount by weight equal to more than 1% of the slag/sludge mixture (e.g., about 2% of the slag/sludge mixture).

The wet scrubber sludge can be derived from a wet scrubber at the same or a different BOF. The wet scrubber typically provides the sludge as a steelmaking byproduct from wet-scrubbing of the fume and gas emissions associated with the BOF. This byproduct then may be thickened to remove water and/or filtered by a press to provide a wet filter cake, or sludge. The resulting sludge can have a moisture content of, for example, about 30%. By using this sludge, the present invention advantageously reduces the need for disposal of such sludges (and the expense associated therewith) and takes advantage of the beneficial constituents of the sludge (e.g., the iron oxides, manganese, etc.)

As described in the '737 patent, the slag/sludge mixture or parts thereof can be thickened or otherwise treated to improve its (or their) handling qualities. Lime treatment of the mixture, for example, can be used to further dehydrate the mixture, facilitate handling of the mixture, and/or to agglomerate the finer particles so that they are not carried away from the BOF vessel by the off gases of the BOF.

The slag/sludge mixture preferably is introduced into the BOF during an oxygen introduction stage of the steelmaking operation. This stage is commonly referred to as oxygen blowing (or an oxygen blow). While some slag/sludge mixtures can be introduced prior to oxygen blowing, the turbulence developed in the BOF typically makes it more desirable to perform the slag/slug mixture introduction during the oxygen introduction stage. In particular, the turbulence generated in the BOF by the oxygen blow process makes it easier for beneficial ingredients in the slag/sludge mixture to become liberated and react with the other contents of the BOF. Moreover, the undesirable non-ferrous compounds contained in the slag/sludge mixture are instantaneously vaporized by the hot reactive temperatures and the high carbon atmosphere during the introduction of oxygen. Otherwise, there is a risk that some of the undesirable ingredients, such as zinc, if present, will become trapped in the bottom of the BOF and accumulate detrimentally in the BOF.

Preferably, the hot slag that is used in the slag/sludge mixture is taken from the slag that solidifies on the walls of the vessel used to carry the slag out from the BOF. That particular kind of slag advantageously provides larger chunks than the molten slag. Typically, much of the molten slag is converted into fine particles. Absent further processing (e.g., using lime, sintering, screening, magnetic separation, or agglomeration techniques), such fine particles are difficult to transport to the BOF in the slag/sludge mixture and are less likely to be retained in the BOF when introduced. It therefore is easier to recover the desirable ingredients from the wall-solidified slag than the molten slag.

Preferably, the hot slag is broken into the exemplary particles size wherein about half of the particles are larger than about 20 mesh. Screening of the hot slag can be performed to provide desired particle sizes in the slag/sludge mixture. By selectively controlling the particle size, it is possible to provide the slag/sludge mixture in a form that is most easily transported to the BOF and most efficiently used thereby.

An exemplary implementation of the present invention was carried out experimentally at one of Bethlehem Steel Corporation's facilities. The BOF at that facility is associated with a wet scrubber, thickener, and filtration system, as described above. The sludge (or filter cake) produced at the filtration system was combined with the hot slag from the BOF, using a slag-to-sludge ratio less than 1:1. In particular, the exemplary slag-to-sludge ratio was about 0.21:1.

The resulting slag/sludge mixture, after curing for about 16 hours, had been dehydrated by the heat from the hot slag to a moisture content of only about 6%. Notably, this was achieved without the need for external heat sources or the expenses typically associated with operating such heat sources.

About half of the resulting mixture had a particles size of 20 mesh or larger. The bulk density of the resulting mixture was about 145 pounds per cubic foot. A chemical analysis of the slag/sludge mixture provided the following results on a percent-by-weight, dry basis:

| CHEMICAL | PERCENTAGE |
| --- | --- |
| Fe (metallic, as well as FeO and $Fe_2O_3$) | 54 |
| CaO | 20 |
| Zinc | 5 |
| Manganese | 2 |

Notably, the $Fe_2O_3$ is comprised of about 70% Fe and about 30% oxygen, by weight. The FeO also provides a source of oxygen, albeit a smaller percentage per molecule than the $Fe_2O_3$. The exemplary slag/sludge mixture also provides a source of manganese and metallic iron.

In a typical BOF operation, samples of all of the ingredients are chemically analyzed, and the ingredients are introduced into the BOF in amounts based on the chemical analyses. In particular, the results of the chemical analyses are applied to the BOF's control system. The control system responds by predicting, based on the desired characteristics of the steel, a predetermined total of each ingredient required by the BOF to achieve the desired characteristics. The ingredients in the slag/sludge mixture that are introduced into the BOF contribute to the predetermined totals. Thus, each cycle of the BOF exhibits a reduced demand for ingredients from sources other than the slag/sludge mixture.

During a heat cycle of the BOF, samples are taken and analyzed to determine when the desired characteristics have been achieved. Upon achieving the desired characteristics, the steel product is removed from the BOF, and the BOF is prepared for the next heat cycle.

When the foregoing exemplary slag/sludge mixture was introduced into a BOF, the control system responded by requiring a shorter oxygen introduction time. At the time, the BOF was set to produce about 590,000 pounds of steel. The amount of slag/sludge mixture that was introduced into the BOF during each heat cycle was about 30,000 pounds. It has been determined, however, that significant benefits can be derived from amounts between about 2,000 pounds and about 30,000 pounds of the slag/sludge mixture. Generally, the benefit derived from the method (reduction in time, reduction in materials required, etc.) increases as the amount of slag/sludge mixture used in each heat increases.

In order to produce the desired 590,000 pounds of steel, the BOF was charged with about 541,124 pounds of molten iron and about 90,589 pounds of scrap material. Introduction of the slag/sludge mixture began about 1 minute after the oxygen blow began, and continued for about another minute.

Preferably, introduction of the slag/sludge mixture is completed within about two minutes after the beginning of oxygen blow. This is so regardless of the amount of slag/sludge mixture being introduced. The rate of introduction therefore can increase as the amount of slag/slug mixture increases.

The delay of about 1 minute between the beginning of an oxygen blow and the introduction of the slag/sludge mixture can be provided so that the fire resulting from the oxygen blow does not extinguish. This delay period can be referred to as an ignition period.

Preferably, introduction of the slag/sludge mixture is completed within about 2 minutes after the oxygen blow begins because this is the period of time during which oxygen is more readily absorbed by the non-carbon-monoxide-producing contents of the BOF. The non-carbon-monoxide-producing contents (e.g., the silicon, titanium, and phosphorus) react more readily with the oxygen contents of the slag/sludge mixture than does the carbon in the BOF. In addition, during the initial portion of the oxygen blow, the bath and gases within the BOF are cooler. The gases in the BOF therefore take up less volume and have a lower exit velocity. Less material therefore is ejected out of the BOF vessel and escapes the hood above the vessel when the slag/sludge mixture is introduced during the early stages of the oxygen blow.

By contrast, later during the oxygen blow, so much of the non-carbon-monoxide-producing contents have oxidized that the carbon in the BOF competes more effectively for the oxygen in the BOF. As a result, introduction of the slag/sludge mixture later in the oxygen blow tends to increase the amount of the oxygen that reacts with carbon to produce carbon monoxide, and this, in turn, causes more material to be ejected from the vessel and to escape the hood system over the BOF vessel. The resulting increase in carbon monoxide emissions is undesirable. The oxygen content of the slag/sludge mixture therefore is used more effectively and in a more environmentally friendly manner, by introducing it during the early stages of the oxygen blow rather than during later stages.

By introducing the slag/sludge material during the oxygen blow operation, the exemplary implementation takes advantage of the turbulence and heat developed in the BOF by the oxygen reaction. The resulting turbulent reaction liberated oxygen from the iron-based compositions and thereby reduced the demand, by the BOF, for oxygen from a source other than the slag/sludge mixture. The turbulent reaction, heat, and high-carbon atmosphere generated during the oxygen blow, in a similar manner, enhances the reactions with other beneficial ingredients in the slag/sludge mixture.

Compared to steel production in the same BOF without the slag/sludge mixture, substantially the same quality and quantity of steel was produced, but in a shorter period of time and using less of the raw materials from sources other than the slag/sludge mixture.

Without the slag/sludge mixture, production of the same quality and quantity of steel using the BOF requires about 483,482 pounds of molten iron, about 158,466 pounds of scrap material, and about 482,620 cubic feet of oxygen at a rate of 24,000 cubic feet per minute. By contrast, when the BOF received 30,000 pounds of the slag/sludge mixture in the manner described above, the same quality and quantity of steel was produced using about 541,124 pounds of molten iron, about 90,589 pounds of scrap material, and about 472,246 cubic feet of oxygen. Since less oxygen from an outside source was required (i.e., about 10,374 fewer cubic feet), at a rate of 24,000 cubic feet per minute, the oxygen blow time was reduced by about 25.9 seconds. The 25.9-second reduction represents a more than 2% decrease from the typical oxygen blow time of about 20 minutes. The exemplary implementation of the method therefore provides significant savings to the extent that each heat cycle of the BOF requires the operator to purchase 10,374 fewer cubic feet of oxygen from its vendor. This represents an enormous cost savings, especially when considered cumulatively over numerous heat cycles of the BOF.

For a heat cycle that lasts on the order of about 40 minutes, the 25.9-second reduction in heat time (notably more than a 1% reduction in heat time) represents a significant advance. It increases productivity because more heat cycles (i.e., steel production cycles) can be performed in a single year. It also saves energy, because each batch of steel requires less operating time from the BOF. As yet another advantage, the steel is produced using ingredients that are reclaimed from the slag/sludge mixture. Thus, in the exemplary implementation, there is a reduction in the demand for oxygen, iron, and manganese by the BOF.

With respect to manganese, it is understood that manganese can cost as much as $500 per ton to purchase. The reduction in demand for sources of manganese outside of the slag/sludge mixture, therefore, represents another significant reduction in costs.

There is also a significant reduction in disposal costs, because the materials that are reclaimed do not consume landfill space and need not be transported thereto. The environmental benefits of conserving landfill space and eliminating the risk that such materials will be spilled during transport are still further examples of the benefits derived from the exemplary implementation.

Notably, the foregoing reductions in cost, increases in productivity (amount of steel produced per day), and environmental benefits are provided with no significant reduction in the quality or quantity of steel produced by the BOF, and without the need for any significant capital expenditures (as might otherwise be required if expensive and capital-intensive heating/dehydration equipment were used). Instead, they are provided by selectively controlling (1) the amount of slag/sludge mixture introduced into the BOF, (2) the ratio of slag-to-sludge in the mixture, and/or (3) the time during which the slag/sludge mixture is introduced.

Figure 1:
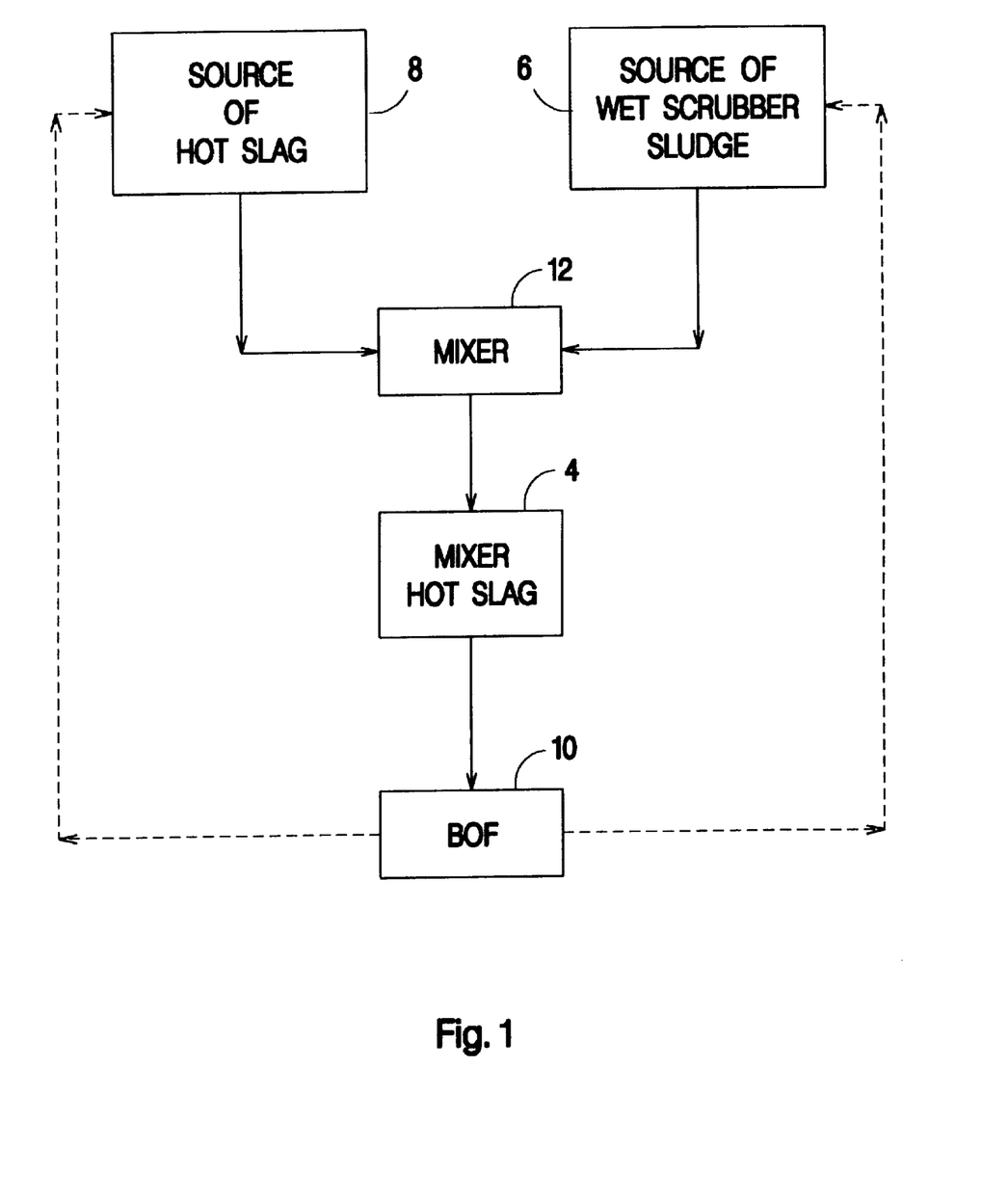
FIG. 1 is a block diagram illustrating a system for improving the efficiency of a BOF operation, according to a preferred embodiment of the present invention.

FIG. 1 schematically illustrates a system for improving the efficiency of a BOF operation, according to a preferred embodiment of the present invention. The system comprises a mixer 2 and an introduction mechanism 4.

The mixer 2 is connected to a source 6 of wet scrubber sludge and a source 8 of hot slag. The mixer 2 is adapted to combine the wet scrubber sludge with hot slag to provide the aforementioned slag/sludge mixture. The mixer 2 can be provided using any conventional mechanism for mixing such materials. It can include, for example, conveyors (e.g., belt conveyors) which feed the two materials from their respective sources 6,8 into a common pile, or earth moving equipment (e.g., a front end loader) that brings discrete loads of the material from their respective sources 6,8 and drops such loads into a common pile. The materials can be mixed simultaneously, or can be applied alternatingly in successive layers of the pile.

The introduction mechanism 4 is adapted to transport the slag/sludge mixture from the mixer 2 to the BOF 10 and is adapted to introduce the slag/sludge mixture into the BOF during a steelmaking operation of the BOF. Introduction mechanisms capable of feeding material into a BOF are well known. They may comprise conveyors, chutes, earth-moving equipment (e.g., a front end loader), or a combination thereof. The details of such mechanisms therefore need not be described herein. Typically, such mechanisms are computer-controlled. The present invention thus contemplates a modification to the computer software (or the parameters used by the software) to account for the introduction of the slag/sludge mixture by the introduction mechanism 4. In particular, the control software can be modified so that the amounts and timing of the slag/sludge mixture introduction coincide with the amounts and timing described above, or alternatively so that they coincide with some other amounts and timing deemed desirable in view of the advantages provided by the present invention and/or any differences in the desired steel product or other operating parameters of the BOF.

Preferably, the mixer 2 and introduction mechanism 4 are operable in conjunction with the BOF 10 so that the BOF 10 produces a desired quantity and quality of steel in a manner that is more efficient than without the slag/sludge mixture. By programming or otherwise suitably controlling the mixer 2 and introduction mechanism 4 to carry out the method described above, the slag/sludge mixture can be introduced into the BOF 10 in such a way that a more efficient BOF operation is provided.

The introduction mechanism 4, for example, can be controlled or otherwise suitably adapted to introduce the slag/sludge mixture during an oxygen introduction stage of the steelmaking operation, preferably, early during the oxygen introduction stage.

Likewise, in accordance with the method described above, the mixer 2 and introduction mechanism 4 can be suitably controlled or otherwise adapted to provide the slag/sludge mixture in such a way that, as compared to the same steelmaking operation when carried out without introduction of the slag/sludge mixture, the amount of time required by the BOF 10 to substantially achieve the desired quantity and quality of steel is reduced (e.g., by more than 0.5%, and more desirably, at least 1%). Preferably, this reduction in time, as indicated above, corresponds to a reduction in the oxygen introduction time of the steelmaking operation. More specifically, it preferably corresponds to a reduction of the oxygen introduction time by more than 1%, and more desirably at least 2%.

As indicated by the broken lines in FIG. 1, the hot slag and the wet scrubber sludge can be derived from the same BOF 10. The fume and gas emissions from the BOF 10, for example, can be wet-scrubbed and the resulting byproduct can be thickened and/or filtered to provide the wet scrubber sludge in the form of a filter cake. Likewise, the hot slag from the same BOF 10 can be placed in a pile that serves as the source 8 of hot slag for the mixer 2.

Preferably, the mixer 2 is controlled or otherwise suitably adapted to combine the wet scrubber sludge with the hot slag while the hot slag has a temperature below the molten state. As indicated above, this reduces any likelihood that the hot slag will react violently with the moisture in the wet scrubber sludge. Preferably, the mixer 2 is controlled or otherwise suitably adapted to dehydrate the slag/sludge mixture using heat contained in the hot slag so that the slag/sludge mixture has a moisture content of less than 10% by weight before introduction into the BOF 10.

The mixer 2 preferably provides ingredients in the slag/sludge mixture so that they react inside the BOF 10 to reduce the demand by the BOF 10 for such ingredients. The mixer 2 can adjust the ingredient content of the slag/sludge mixture by adjusting, for example, the slag-to-sludge ratio of the mixture. Such ingredients, as indicated above, can include, for example, iron, oxygen, and manganese. Iron-based compositions in the mixture, such as FeO and $Fe_2O_3$, can provide a source of oxygen.

Preferably, the introduction mechanism 4 is suitably controlled or otherwise adapted to introduce the slag/sludge mixture into the BOF 10 during a portion of the oxygen introduction stage when oxygen provides a turbulent reaction in the BOF 10, so that the turbulent reaction liberates oxygen from the iron-based compositions and thereby reduces the demand, by the BOF 10, for oxygen from a source other than the slag/sludge mixture. This advantageously is achieved without significantly reducing the quantity and quality of the steel product. Similarly, without reducing the quantity or quality of the steel product, the manganese in the slag/sludge mixture reduces the demand, by the BOF 10, for manganese from a source other than the slag/sludge mixture.

Preferably, the mixer 2 combines the slag/sludge mixture at a slag-to-sludge ratio between about 0.1:1 and about 10:1. Within that range, slag-to-sludge ratios below 1:1 have been found more desirable. The exemplary slag-to-sludge ratio of 0.21:1 demonstrates use of such low ratios to provide advantageous savings in operating costs, to reduce environmental impact, and to also increase productivity.

Preferably, the mixer 2 is controlled or otherwise suitably adapted to combine the slag/sludge mixture using a slag-to-sludge ratio less than 1:1 and in such a way that the slag/sludge mixture includes (1) manganese in an amount by weight greater than about 1% and (2) iron-based compositions selected from the group consisting of: FeO and $Fe_2O_3$. Preferably, the mixer 2 also is controlled or otherwise suitably adapted to combine the slag/sludge mixture in such a way that the iron-based compositions constitute more of the slag/sludge mixture than any other single constituent thereof (e.g., at least half of the slag/sludge mixture).

Figure 2:
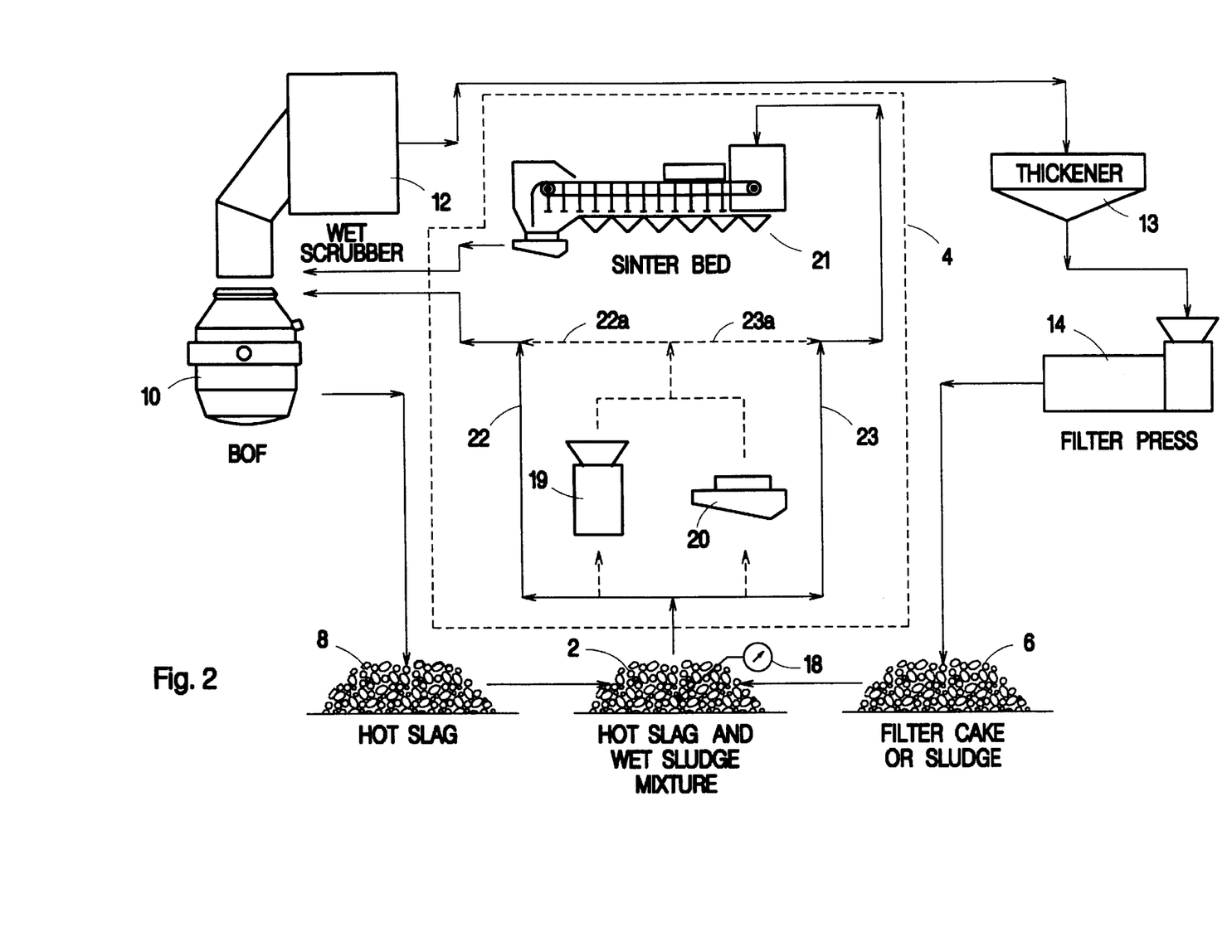
FIG. 2 is a schematic illustration of the system when adapted to perform optional steps of sintering, separation, and screening.

With reference to FIG. 2, the system can be configured so that the optional steps of separation, screening and/or sintering are carried out by a magnetic separator 19, a screening mechanism 20, and/or a sinter bed 21, respectively. Preferably, as shown in FIG. 2, the magnetic separator 19, the screening mechanism 20, and/or the sinter bed 21 are provided as part of the introduction mechanism 4. The moisture level of the slag/sludge mixture prior to entering the introduction mechanism 4 can be detected using a suitable moisture detector 18.

FIG. 2 shows the preferred embodiment wherein the hot slag source 8 is derived from the BOF 10 and wherein the wet scrubber sludge source 6 is derived from the output 11 of the BOF's wet scrubber 12, which output 11 then is subjected to a thickening process and a filtering processes in a thickener 13 and a filter press 14, respectively.

The BOF 10 preferably is controlled by a computer-based control system. The control system, much like existing control systems in the steelmaking industry, is implemented using a computer that operates according to instructions in a software program. Typically, such control systems can be reprogrammed or otherwise adapted to compensate for changes in the desired steelmaking process.

According to a preferred implementation of the present invention, the computer-based control system is adapted to receive information about the ingredients of the slag/sludge mixture. The computer-based control system then determines the operating parameters of the BOF based on this information. In particular, the computer-based control system receives information regarding a desired steel product, receives information regarding the ingredients in the slag/sludge mixture, and determines (1) how much of the ingredients from sources other than the slag/sludge mixture are needed and (2) how the BOF will operate based on this determination and the information regarding the desired steel product. In doing so, the computer-based control system reduces the need for the ingredients from other sources, such as oxygen, reduces the overall time required by the heat cycle, and/or reduces the requisite oxygen blow time. These determinations then can be used to operate the mixer 2 and introduction mechanism 4 accordingly. The computer-based control system, in this regard, can selectively control (1) the amount of slag/sludge mixture introduced into the BOF, (2) the ratio of slag-to-sludge in the mixture, and/or (3) the time during which the slag/sludge mixture is introduced.

The present invention also provides a method of accommodating production interruptions downstream of the BOF with minimal, if any, adjustment to the rate of molten iron production at a blast furnace upstream of the BOF. As indicated above, it is seldom practical to change the blast furnace's charge material or other operating parameters to slow production and thereby compensate for any downstream production interruptions. The impracticality of such an approach is evident from the delay between the adjustments and their effect on the blast furnace's output. Additional disadvantages of this approach are the inefficiencies associated with taking the blast furnace out of its optimum operating conditions.

The present invention provides a way of minimizing, if not avoiding the back log of molten iron, by selectively increasing the molten-iron-to-scrap ratio demanded by the BOF. Because of the desirability of recycling steelmaking byproducts, this method of accommodating interruptions in downstream production is advantageously carried out using material recycled from previous operations of the BOF.

More specifically, the method comprises the steps of combining a wet scrubber sludge with hot slag to provide a slag/sludge mixture, commencing a steelmaking operation of the BOF; and introducing the slag/sludge mixture into the BOF during the steelmaking operation of the BOF so that the BOF produces the same quantity and quality of steel using a higher molten-iron-to-scrap ratio than without the slag/sludge mixture.

Preferably, the slag/sludge mixture has a slag-to-sludge ratio between about 0.5:1 and about 10:1. More desirably, the slag-to-sludge ratio is between about 0.5:1 and about 1:1, and most desirably, about 0.66:1.

The method of accommodating interruptions in downstream production was tested at one of Bethlehem Steel Corporation's Facilities. In particular, it was tested during production of 590,000 pounds of steel in a BOF.

When no slag/sludge mixture was added, the BOF required about 483,482 pounds of molten iron and about 158,466 pounds of scrap material to produce 590,000 pounds of the desired quality of steel. By contrast, when 2,000 pounds of the slag/sludge mixture was introduced into the BOF in the manner described above (i.e, for a period of about one minute beginning about one minute after the oxygen blow began), the BOF required about 487,854 pounds of molten iron and 153,599 pounds of scrap material to produce 590,000 pounds of the same quality of steel. Notably, this required less scrap material, but increased the demand for molten iron by about 4,372 pounds.

Moreover, when 30,000 pounds of the slag/sludge mixture was introduced in the manner described above, the BOF required about 543,182 pounds of molten iron and 92,104 pounds of scrap material to produce 590,000 pounds of the same quality of steel. Notably, this required far less scrap material, but increased the demand for molten iron by about 59,700 pounds. The addition of the slag/sludge mixture increased the molten-iron-to-scrap ratio demanded by the BOF by more than 93%. This represents an increased demand for molten iron of more than 12% per heat. This increased demand for molten iron can be used to accommodate downstream interruptions in production, with minimal, if any, adjustment to the rate of molten iron production at the blast furnace upstream of the BOF. Even if the adjustments to the blast furnace production cannot be eliminated completely (e.g., when the interruption is long), they can be made more gradual by the foregoing method. Gradual adjustments are for more acceptable and practical than more sudden adjustments to the blast furnaces's rate of production.

Another advantage of the exemplary method is the ability to reduce scrap consumption by inserting steelmaking byproducts (i.e., the slag/sludge mixture) into the BOF. Notably, for every pound of the exemplary slag/slug mixture that was added, the scrap requirements decreased by about two pounds. The slag/slug mixture is a more effective coolant than the scrap material, and as a result, allows the BOF to consume more molten iron during each heat. The introduction of the slag/sludge mixture thus can be adjusted to selectively regulate molten iron consumption when production requirements downstream of the BOF change. If the anticipated delay is long, for example, a larger amount of the slag/sludge mixture can be added to the BOF. Likewise, if the downstream interruption is expected to be short, the amount of slag/sludge mixture added to the BOF can be appropriately reduced.

The benefits of keeping the blast furnace production at its optimal rate, or at least minimizing the adjustments thereto, far outweigh any costs or disadvantages associated with increased molten iron consumption. Any increase in production time is of little, if any, consequence since the production downstream has been interrupted. Moreover, the ability to effect the requisite compensation in a relatively short period of time, compared to the amount of time required to effect changes in blast furnace production, allows a more rapid response to interruptions in downstream production.

Preferably, the slag/sludge mixture is mixed with lime (or a similar acting material) prior to introduction into the BOF (e.g., in a hopper above the BOF). The lime advantageously dilutes the slag/sludge mixture and moderates the reaction within the BOF.

While this invention has been described as having a preferred design, it is understood that the invention is not limited to the illustrated and described features. To the contrary, the invention is capable of further modifications, usages, and/or adaptations following the general principles of the invention and therefore includes such departures from the present disclosure as come within known or customary practice in the art to which the invention pertains, and as may be applied to the central features set forth above, and which fall within the scope of the appended claims.

What is claimed is:

1. A method of steelmaking in a basic oxygen furnace operation, comprising the steps of:

combining a web scrubber sludge with hot slag having a temperature less than the molten state to provide a slag/sludge mixture;

commencing a steelmaking operation of the basic oxygen furnace;

introducing the slag/sludge mixture into the basic oxygen furnace during the steelmaking operation of the basic oxygen furnace so that the basic oxygen furnace produces a desired quantity and quality of steel.

2. The method of claim 1, wherein said step of introducing the slag/sludge mixture is performed during an oxygen introduction stage of said steelmaking operation.

3. The method of claim 1, further comprising the step of reducing an amount of time required to substantially achieve said desired quantity and quality of steel, by selectively increasing or decreasing at least one of:

an amount of slag/sludge mixture introduced into a basic oxygen furnace;

a slab-to-sludge ratio of the slag/sludge mixture; and a time of introduction of the slag/sludge mixture into a basic oxygen furnace.

4. The method of claim 3, wherein said amount of time required to substantially achieve said desired quantity and quality of steel is reduced by more than 0.5%.

5. The method of claim 3, wherein said amount of time required to substantially achieve said desired quantity and quality of steel is reduced by at least 1%.

6. The method of claim 1, further comprising the step of reducing an oxygen introduction time of the steelmaking operation, without significantly reducing said desired quantity and quality of steel, by selectively increasing or decreasing at least one of:

an amount of slag/sludge mixture introduced into a basic oxygen furnace;

a slab-to-sludge ratio of the slag/sludge mixture; and a time of introduction of the slag/sludge mixture into a basic oxygen furnace.

7. The method of claim 1, wherein said wet scrubber sludge is provided by wet-scrubbing at least one of the fume and gas emissions from the basic oxygen furnace.

8. The method of claim 1, wherein said step of combining the wet scrubber sludge with hot slag is performed using hot slag from a basic oxygen furnace.

9. The method of claim 1, wherein said hot slag has a temperature below a molten state of the hot slag during said step of combining the wet scrubber sludge with the hot slag.

10. The method of claim 1, wherein the slag/sludge mixture has a moisture content of less than 10% by weight during introduction into the basic oxygen furnace.

11. The method of claim 1, wherein said slag/sludge mixture is combined at a slag-to-sludge ratio no greater than about 10:1.

12. The method of claim 1, further comprising the steps of: supplying an amount of at least one ingredient of the slag/sludge mixture to the basic oxygen furnace; and reducing a corresponding amount of the at least one ingredient from sources other than the slag/sludge mixture.

13. The method of claim 12, wherein said at least one ingredient is oxygen.

14. The method of claim 12, wherein said at least one ingredient is manganese.

15. The method of claim 12, wherein said at least one ingredient is iron.

16. The method of claim 1, wherein the slag/sludge mixture includes manganese and iron-based compositions selected from the group consisting of: FeO and $Fe_2O_3$.

17. The method of claim 16, wherein said slag/sludge mixture is introduced into a basic oxygen furnace during an oxygen introduction stage of said steelmaking operation, said method further comprising the steps of:

reducing an amount of time required to substantially achieve said desired quantity and quality of steel; and reducing an oxygen introduction time of the steelmaking operation, without significantly reducing said desired quantity and quality of steel.

18. The method of claim 17, wherein said slag/sludge mixture is introduced into a basic oxygen furnace during a portion of the oxygen introduction stage when oxygen provides a turbulent reaction in the basic oxygen furnace.

19. The method of claim 16, further comprising the steps of: supplying an amount of manganese from the slag/sludge mixture; and reducing a corresponding amount of the manganese from a source or sources other than the slag/sludge mixture, without significantly reducing said quantity and quality of the steel product.

20. The method of claim 1, wherein the slag/sludge mixture is introduced into a basic oxygen furnace during an oxygen introduction stage of said steelmaking operation, said method further comprising the steps of:

reducing an amount of time required to substantially achieve said desired quantity and quality of steel; and reducing an oxygen introduction time of the steelmaking operation, without significantly reducing said desired quantity and quality of steel.

21. The method of claim 1, wherein said slag/sludge mixture is combined at a slag-to-sludge ratio between about 0.1:1 and about 10:1.

22. The method of claim 1, wherein the slag/sludge mixture is combined at a slag-to-sludge ratio of less than 1:1 and includes manganese in an amount by weight greater than about 1% and iron-based compositions selected from the group consisting of: FeO and $Fe_2O_3$, said iron-based compositions constituting more of said slag/sludge mixture than any other single constituent thereof.

23. The method of claim 22, wherein said iron-based compositions constitute at least half of said slag/sludge mixture.

24. A system for improving the efficiency of a basic oxygen furnace operation, said system comprising:

a mixer connected to a source of wet scrubber sludge and a source of hot slag having a temperature less than the molten state, said mixer being adapted to combine the wet scrubber sludge with hot slag having a temperature less than the molten state to provide a slag/sludge mixture; and an introduction mechanism adapted to transport the slag/sludge mixture from the mixer to a basic oxygen furnace and adapted to introduce the slag/sludge into the basic oxygen furnace during a steelmaking operation of the basic oxygen furnace;

said mixer and said introduction mechanism being operable in conjunction with the basic oxygen furnace so that the basic oxygen furnace produces a desired quantity and quality of steel.

25. The system of claim 24, wherein said introduction mechanism structurally is structurally adapted to introduce the slag/sludge mixture during an oxygen introduction stage of the steelmaking operation.

26. A system for improving the efficiency of a basic oxygen furnace operation, said system comprising:

i) a mixer connected to a source of wet scrubber sludge and a source of hot slag having a temperature less than the molten state, said mixer being adapted to combine the wet scrubber sludge with hot slag having a temperature less than the molten state to provide a slap/sludge mixture;

ii) an introduction mechanism adapted to transport the slag/sludge mixture from the mixer to a basic oxygen furnace and adapted to introduce the slag/sludge into the basic oxygen furnace during a steelmaking operation of the basic oxygen furnace, said mixer and said introduction mechanism being operable in conjunction with the basic oxygen furnace so that the basic oxygen furnace produces a desired quantity and quality of steel; and iii) a control system structurally configured to reduce the amount of time required by the basic oxygen furnace to substantially achieve said desired quantity and quality of steel by selectively controlling at least one of:

an amount of slag/sludge mixture introduced into a basic oxygen furnace;

a slag-to-sludge ratio of the slag/sludge mixture; and a time of introduction of the slag/sludge mixture into a basic oxygen furnace.

27. The system of claim 24, wherein said mixer structurally is adapted to combine the wet scrubber sludge with the hot slag while the hot slag has a temperature below the molten state.

28. The system of claim 24, wherein said mixer structurally is adapted to dehydrate the slag/sludge mixture using heat contained in the hot slag so that the slag/sludge mixture has a moisture content of less than 10% by weight before introduction into the basic oxygen furnace.

29. The system of claim 24, wherein said mixer structurally is configured to combine said slag/sludge mixture at a slag-to-sludge ratio between about 0.1:1 and about 10:1.

30. A method for accommodating production interruptions downstream of a basic oxygen furnace, with minimal, if any, adjustment to the rate of molten iron demand from a blast furnace upstream of the BOF, said method comprising the steps of:

combining a web scrubber sludge with hot slag having a temperature less than the molten state to provide a slag/sludge mixture;

commencing a steelmaking operation of the basic oxygen furnace; and introducing the slag/sludge mixture into the basic oxygen furnace during the steelmaking operation of the basic oxygen furnace so that the basic oxygen furnace produces the same quantity and quality of steel using a higher molten-iron-to-scrap ratio than without the slag/sludge mixture.

31. The method of claim 30, wherein said slag/sludge mixture has a slag-to-sludge ratio between about 0.5:1 and about 10:1.

32. The method of claim 30, wherein said slag/sludge mixture has a slag-to-sludge ratio between about 0.5:1 and about 1:1.

33. The method of claim 30, wherein said slag/sludge mixture has a slag-to-sludge ratio of about 0.66:1.

34. The method of claim 30, further comprising the step of introducing enough of the slag/sludge mixture that the molten-iron-to-scrap ratio increases by at least 50%.

35. The method of claim 30, further comprising the step of introducing enough of the slag/sludge mixture that the molten-iron-to-scrap ratio increases by at least 93%.

36. The method of claim 30, further comprising the step of increasing a demand by the basic oxygen furnace for molten iron, without substantially changing the quality and quantity of the steel produced by the basic oxygen furnace.

37. The method of claim 30, further comprising the step of increasing, by at least 12%, the demand by the basis oxygen furnace for molten iron, without substantially changing the quality and quantity of the steel produced by the basic oxygen furnace.

* * * * *